United States Patent
Staub et al.

(10) Patent No.: US 6,369,947 B1
(45) Date of Patent: Apr. 9, 2002

(54) SURFACE PATTERN

(75) Inventors: René Staub, Cham; Wayne Robert Tompkin, Ennetbaden, both of (CH)

(73) Assignee: OVD Kinegram AG, Zug (CH)

(*) Notice: Subject to any disclaimer, the term of this patent is extended or adjusted under 35 U.S.C. 154(b) by 0 days.

(21) Appl. No.: 09/308,809

(22) PCT Filed: Dec. 12, 1996

(86) PCT No.: PCT/EP96/05562

§ 371 Date: Jun. 10, 1999

§ 102(e) Date: Jun. 10, 1999

(87) PCT Pub. No.: WO98/26373

PCT Pub. Date: Jun. 18, 1998

(51) Int. Cl.[7] .............................. G02B 5/18; B42D 15/00
(52) U.S. Cl. ..................... 359/574; 359/575; 359/576; 359/2; 283/91; 283/94; 283/902
(58) Field of Search .................... 359/566, 567, 359/568, 569, 571, 572, 574, 575, 576, 2; 283/86, 91, 94, 902

(56) References Cited

U.S. PATENT DOCUMENTS

| | | | | |
|---|---|---|---|---|
| 3,957,354 A | * | 5/1976 | Knop | 359/568 |
| 4,788,116 A | * | 11/1988 | Hochberg | 430/21 |
| 4,832,445 A | | 5/1989 | Haines et al. | 350/162.2 |
| 4,892,336 A | | 1/1990 | Kaule et al. | 283/91 |
| 5,465,176 A | * | 11/1995 | Bianco et al. | 359/567 |
| 5,969,863 A | * | 10/1999 | Staub et al. | 359/567 |

FOREIGN PATENT DOCUMENTS

| | | |
|---|---|---|
| DE | 195 16 741 A1 | 11/1996 |
| EP | 0 238 043 A2 | 9/1987 |
| EP | 0 247 471 A2 | 12/1987 |
| EP | 0 712 012 A1 | 5/1996 |
| WO | WO 88/05387 | 7/1988 |

* cited by examiner

*Primary Examiner*—Jon Henry
(74) *Attorney, Agent, or Firm*—Proskauer Rose LLP

(57) ABSTRACT

A surface pattern comprises microscopically fine relief structures that diffract visible light. When the surface pattern is illuminated perpendicularly with white light, the surface pattern appears with bright and dark regions from a first viewing direction. The length and/or position and/or number of bright and dark regions changes as the viewing angle changes. Preferably, the contour of the surface pattern is selected so that the length or position of the bright regions changes markedly when the viewing angle changes.

24 Claims, 7 Drawing Sheets

Fig. 8
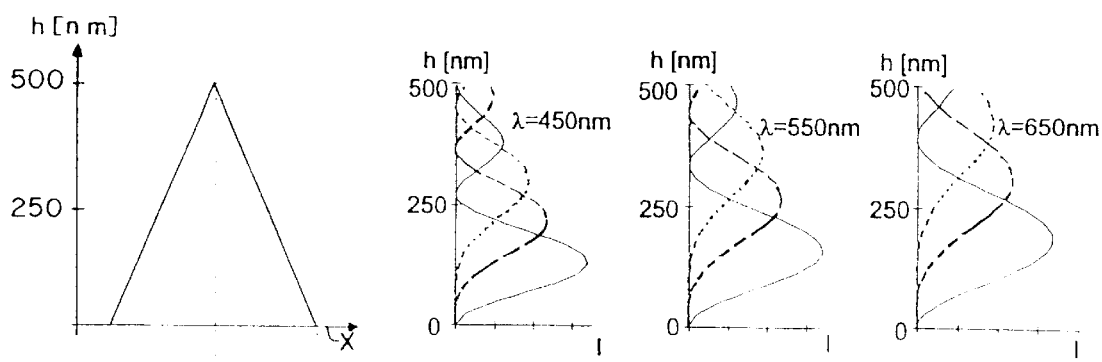
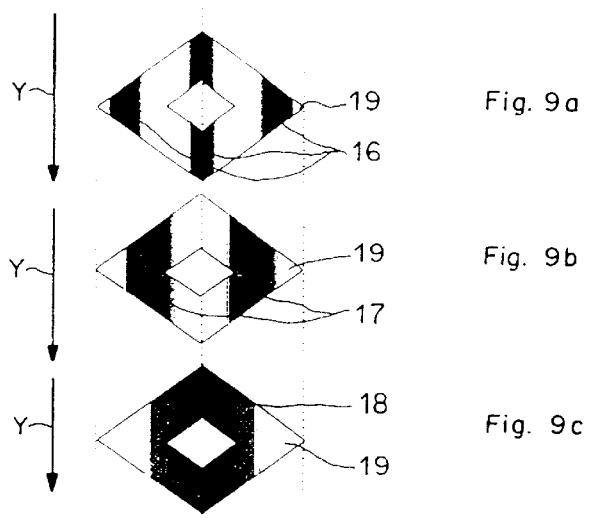
Fig. 9a
Fig. 9b
Fig. 9c
Fig. 10a
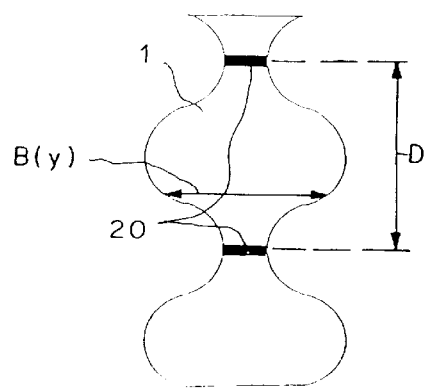
Fig. 10b
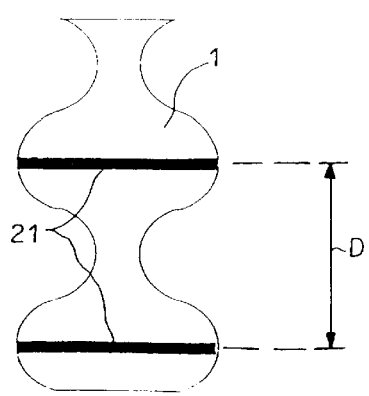

SURFACE PATTERN

The invention concerns a surface pattern of the kind set forth in the classifying portion of claim 1.

Such surface patterns have a microscopically fine relief structure and are suitable as optical security elements for enhancing the degree of security in terms of forgery of value-bearing papers or securities and bonds, passes, means of payment and similar articles.

A surface pattern as set forth in the classifying portion of claim 1 is known from European patent application EP 247 471. The surface pattern has three surface portions with an optically effective diffraction structure. Those structures diffract visible light according to the wavelength thereof at different diffraction angles. The profile height of the grooves or furrows of the three structures is constant in each surface portion but it is fixed differently in each surface portion in such a way that for a given observer, the first structure diffracts blue light, the second structure green light and the third structure red light, with respective vanishing or minimum diffraction efficiency. When the surface pattern is tilted about an axis which is parallel to the furrows of the structures, in accordance with the teaching of the application therefore the first surface portion should appear dark at a first viewing angle, the second surface portion at a second viewing angle and the third surface portion at a third viewing angle, that is to say, a dark spot should abruptly change in position as the surface pattern is continually tilted. When the surface pattern is tilted however the angle of incidence of the light impinging thereon also changes and therewith also the optical profile height of the structures. In that situation the condition that the predetermined spectral color is not diffracted or is diffracted only with a very low level of efficiency is no longer satisfied or it is satisfied only in exceptional cases. If the profile height is selected to correspond to a minimum in regard to the level of diffraction intensity for a predetermined spectral color the surface portions are also usually only relatively weakly visible in the other spectral colors. If the illuminating light source is also wide-spread, which is the case with diffuse daylight in the open air or under a neon tube, then the light is no longer incident from a single defined direction of incidence but impinges on the surface pattern from many directions of incidence. Therefore the surface pattern simultaneously diffracts light of various colors into the eye of the observer. That effect is further increased by the roughness of the substrate. In particular paper substrates have a relatively rough surface. If the observer therefore views the surface pattern for example from a direction into which only green light is diffracted upon illumination with a punctiform light source and when the substrate has a smooth surface, then red and blue light are also diffracted into that direction when the light source is spread and the substrate has a rough surface. The desired effect is therefore greatly reduced or is no longer perceptible at all.

EP-712 012 A discloses a grating with a number of lines of more than 2000 lines per mm, which is effective as a color filter only in the zero diffraction order. In the direction of the zero diffraction order the light which is reflected at the structures of D2 is no longer white but colored as, for certain depths in respect of the impressed structure, one color of the spectrum or the other is entirely extinguished. In particular, in the case of a grating with a rectangular structure, color saturation and color purity can additionally be controlled by varying the peak-to-valley ratio. Tilting the grating structure about an axis in parallel relationship to the grating lines does not alter the color.

The object of the present invention is to propose a surface pattern having diffraction structures which generate optically variable effects which are clearly visible under virtually any illumination conditions and which can therefore be easily checked by the person in the street.

The invention consists of the features recited in claim 1.

Advantageous configurations

Figure 4A:
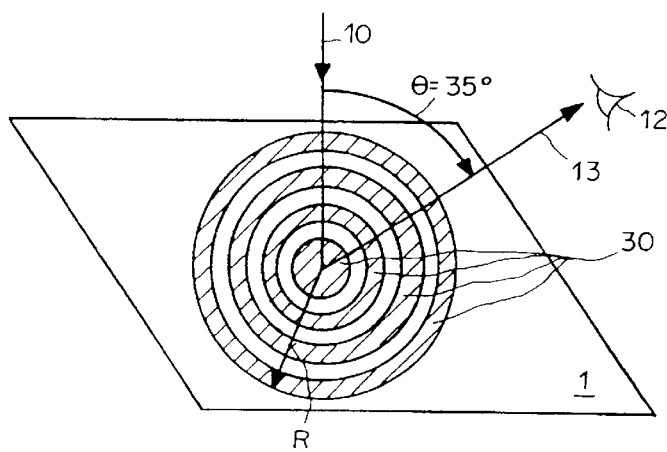
Figure 4B:
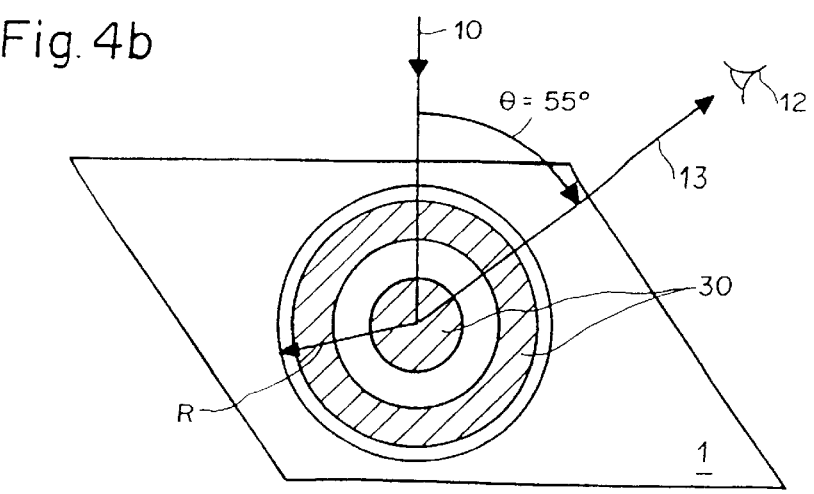

FIGS. 4a and b shows the surface pattern when viewed from selected angles.

Figure 5A:
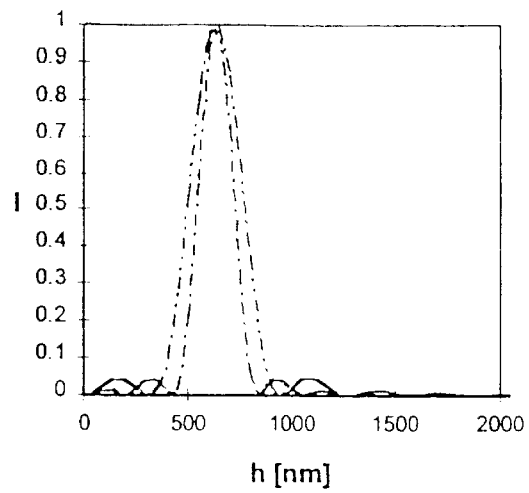
Figure 5B:
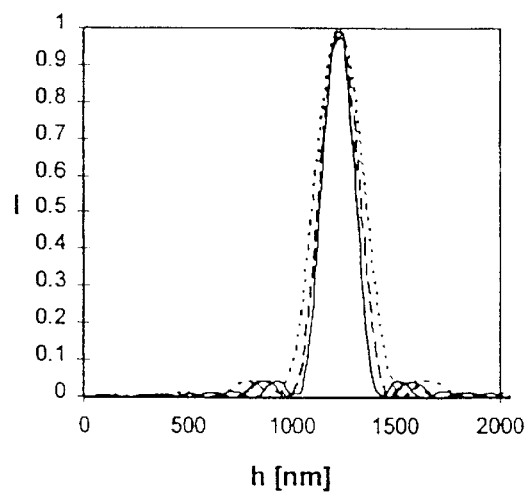
Figure 5C:
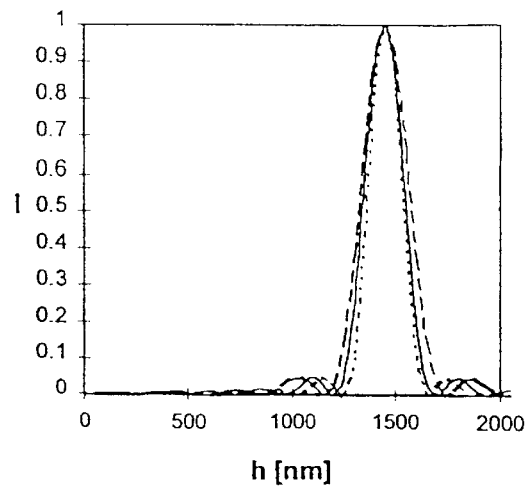

FIGS. 5a–c shows levels of diffraction intensity of a further surface pattern.

Figure 6:
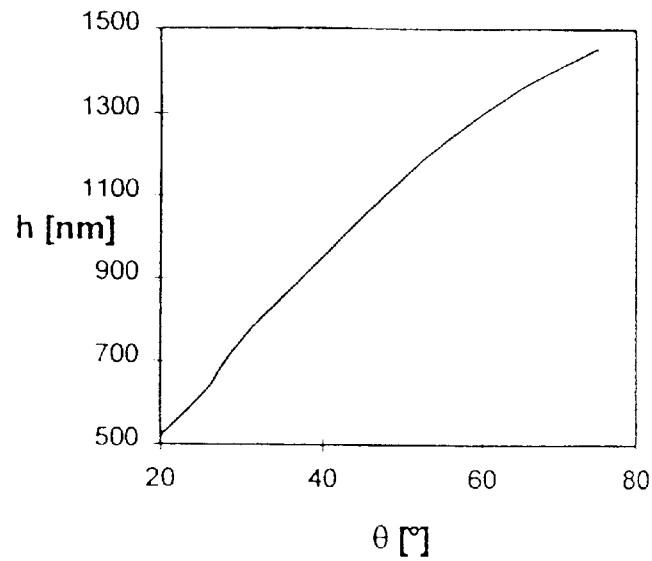

FIG. 6 shows a characteristic curve.

Figure 7:
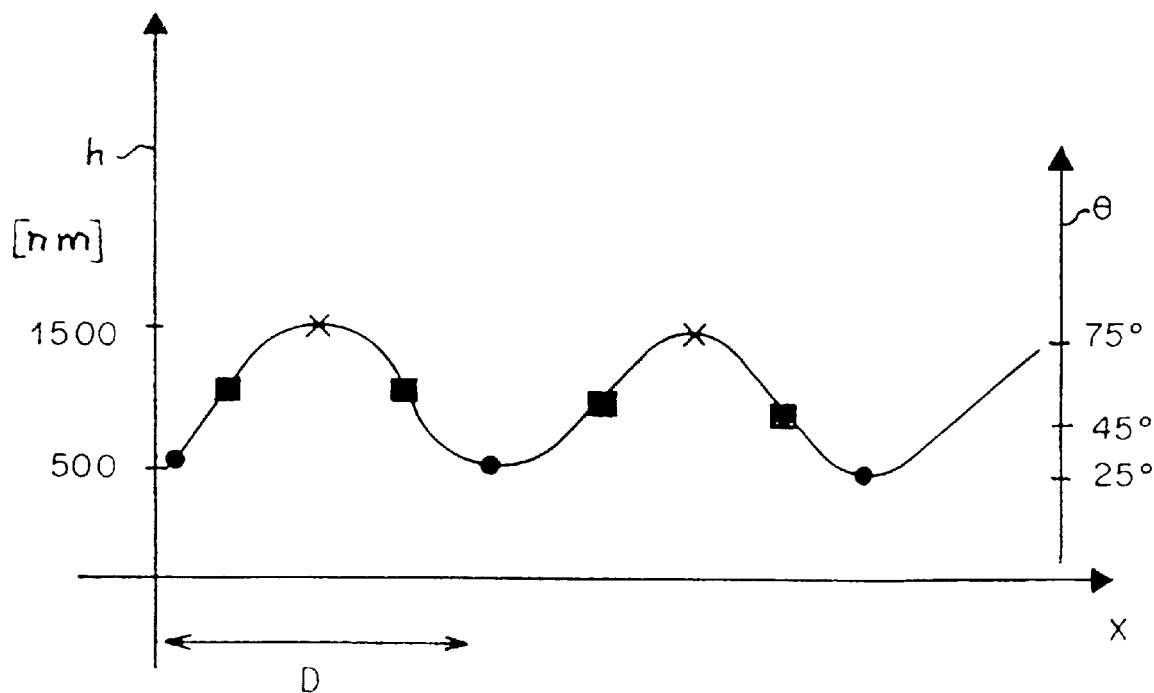

FIG. 7 shows a graph.

FIG. 8 shows a manner of modulation of the profile height of the surface pattern and the levels of intensity of the light diffracted into the first three orders of diffraction in dependence on the profile height.

FIGS. 9a–c shows the surface pattern when viewed from directions associated with three different orders of diffraction.

FIG. 10 shows the surface pattern with a surface portion whose contour facilitates the recognition of varying optical effects.

Figure 11:
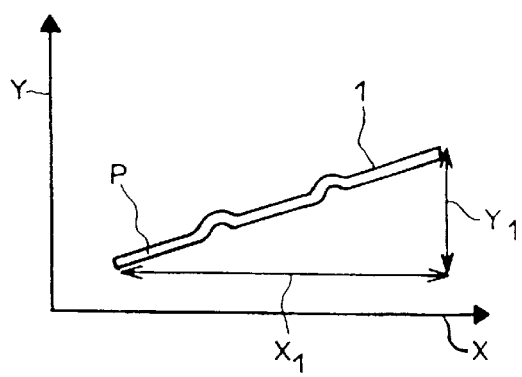

FIG. 11 shows the surface pattern with another surface portion with well-recognisable varying optical effects.

Figure 12:
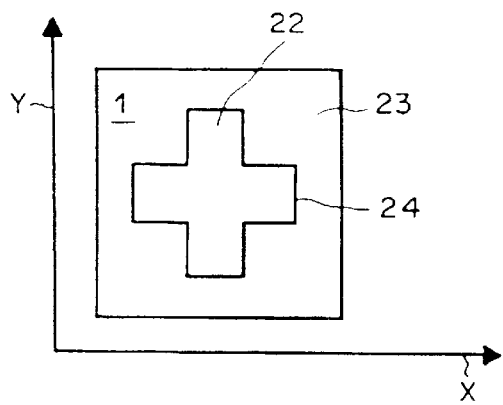

FIG. 12 shows a surface pattern with referencing elements.

Figure 13:
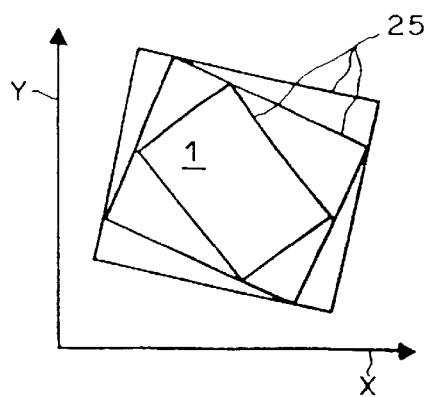

FIG. 13 shows a surface pattern with linear elements, and

Figure 14:
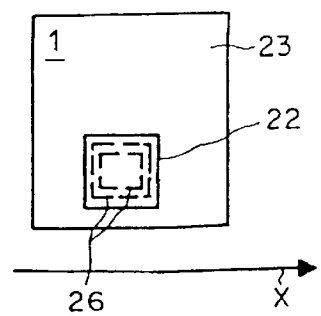

FIG. 14 shows a further surface pattern.

The following should also be referred to as being representative of mathematical methods, algorithms and digital computer programs for the rigorous calculation of diffraction properties of metallic gratings: the book "Electromagnetic Theory of Gratings" R. Petit, Springer Verlag, the article "Rigorous coupled-wave analysis of metallic surface-relief gratings" by M. G. Mobaram and T. K. Gaylord which appeared in the Journal of the Optical Society of America A, Vol. 3(11), pp 1780–1787, 1986, and the software package "GSOLVER V2.0" which permits calculations in accordance with those articles.

Figure 1:
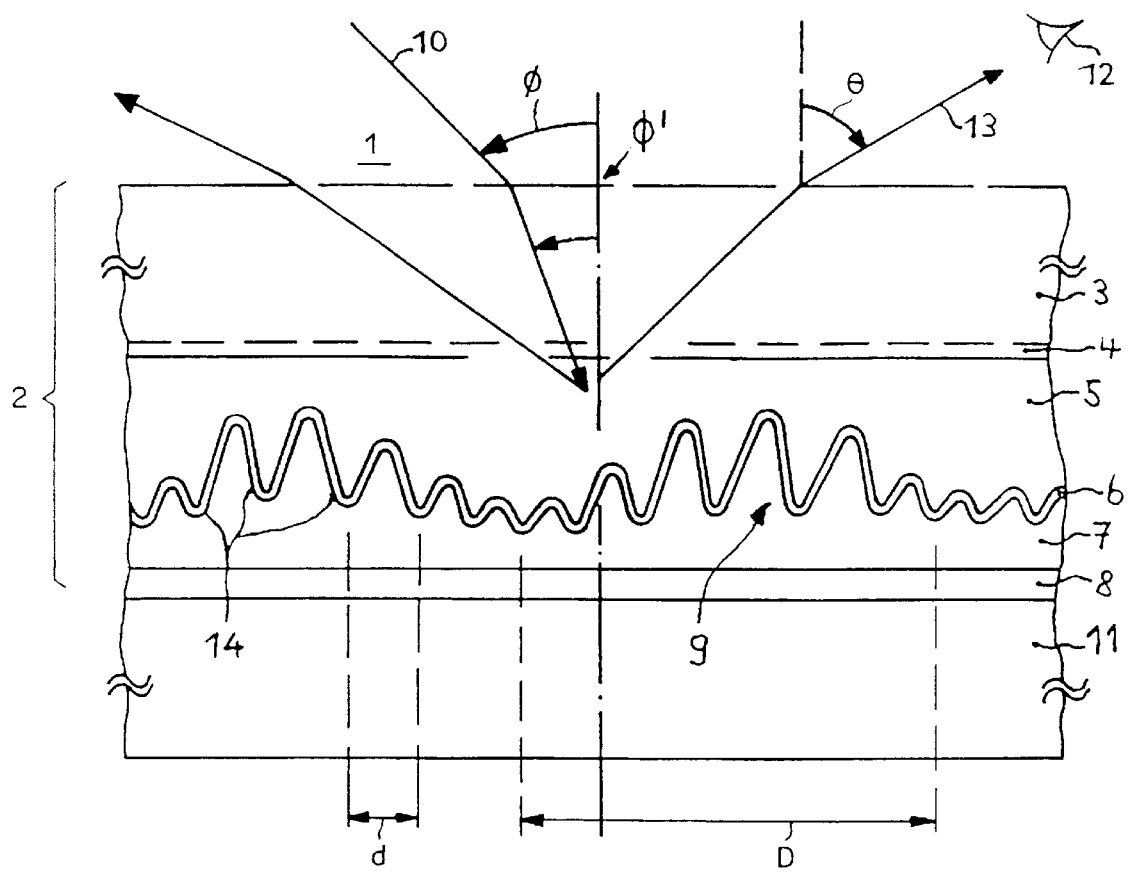
FIG. 1 is a cross-sectional view of a surface pattern with diffractive structures.

FIG. 1 is a cross-sectional view not to scale of a first surface pattern 1 with diffraction structures for producing optically variable effects. The surface pattern 1 is in the form of a layer structure or laminate 2. Applied to a carrier layer 3 in the specified sequence are an intermediate layer 4, a first lacquer layer 5, an at least partially reflecting reflection layer 6, a second lacquer layer 7 and an adhesive layer 8. The layers 3 through 8 form the layer structure or laminate 2. Embedded between the lacquer layers 5 and 7 are microscopically fine relief structures 9 which diffract and at least partially reflect light 10 which is incident at the angle φ of incidence through the lacquer layer 5. The laminate 2 is stuck onto a substrate 11 to be protected, for example a document, with the adhesive layer 8 bearing against the substrate 11. After the surface pattern 1 has been stuck onto the substrate 11 the carrier layer 3 is pulled off. An observer 12 who views the surface pattern 1 from a direction which includes the angle θ to the line normal to the surface pattern 1 sees the light 13 which impinges on the surface pattern 1 from the side of the first lacquer layer 5 and which is reflected at the relief structures 9 and diffracted at the diffraction angle θ.

The thickness and the refractive index n determine the optical properties of the reflection layer 6, for example whether the reflection layer 6 is partially transmissive in relation to visible light and the surface of the substrate 11 is visible, or whether the reflection layer 6 is opaque.

The interface between the lacquer layers 5 and 7 can perform the function of the reflection layer 6 if the materials for the lacquer layers 5 and 7 differ in terms of the refractive index.

In a simple embodiment of the surface pattern 1 the relief structures 9 within at least a surface portion form a grating G with a constant number of lines L and a varying geometrical profile height $h_g$. The grating G extends in a plane whose Cartesian coordinates are identified by x and y. In FIG. 1 the x-direction is oriented perpendicularly to the plane of the drawing and the grooves or furrows 14 of the grating G are selected to be parallel to the x-direction. The geometrical profile shape A of the grating G can be described by a function $A(x,y)=g(x,y)*F(x,y)$, wherein the function $g(x,y)$ describes the profile shape of a grating G' of constant profile height and the function $F(x,y)$ describes the modulation of the profile height of the grating G'. For example, the following applies for a sinusoidal grating G' with grooves or furrows 14 parallel to the x-axis $$g(x, y) = \sin\left(\frac{2\pi}{d}(y - y_0)\right)$$

wherein $d=1/L$ denotes the spacing of the grooves or furrows 14 and $y_0$ denotes any reference point. The modulation function $F(x, y)$ varies slowly in comparison with the spacing d of the furrows 14 of the grating G'. The modulation function F can be aperiodic or periodic. In the case of a periodic modulation function F the modulation length is denoted by D. The diffraction properties of the surface pattern 1 are determined by the optical properties of the reflection layer 6 and the optical profile height h of the relief structures 9. The optical profile height h is the product of the geometrical profile height $h_g$ of the relief structures 9 and the refractive index n of the lacquer layer 5 which covers the relief structures 9 on the side towards the viewer.

EXAMPLE 1

Figure 2:
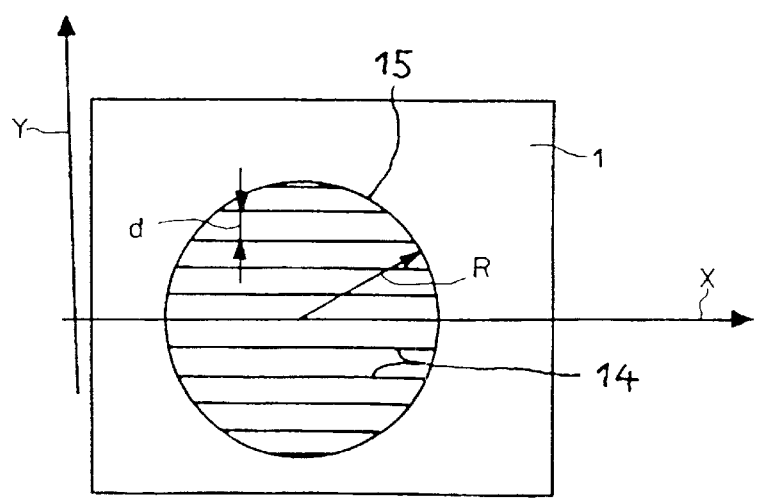
FIG. 2 is a plus view of the surface pattern of FIG. 1.

A FIG. 2 shows a plan view of the surface pattern 1 with the single surface portion. The surface portion is a circle 15 of the radius R. The profile shape of the grating G' is sinusoidal. The optical profile height h of the grating G at the center point $(x_0, y_0)$ of the circle 15 is 150 nm and linearly increases towards the edge. At the edge of the circle 15 the optical profile height h=900 nm. The profile height of the grating G' is therefore modulated with an aperiodic, in portions steady, rotationally symmetrical function F. The geometrical profile shape $A(x,y)$ of the grating G can be described by the following equation:

$$A(x, y) = \frac{1}{n}\left(\frac{150}{2} \text{ nm} + \frac{750}{2} \text{ nm} * \frac{\sqrt{(x-x_0)^2 + (y-y_0)^2}}{R}\right) * \sin\left(\frac{2\pi}{d}(y-y_0)\right) \quad \text{for } (x-x_0)^2 + (y-y_0)^2 \leq R^2. \tag{1}$$

in which x and y denote the Cartesian coordinates of any point and $x_0$ and $y_0$ denote the Cartesian coordinates of the center point of the circle 15. The geometrical profile height $h_g$ of the grating structure at the location $$h_g = \frac{2}{n}\left(75 \text{ nm} + 375 \text{ nm} * \frac{\sqrt{(x-x_0)^2 + (y-y_0)^2}}{R}\right).$$

The example selected corresponds to a grating G of a sinusoidal profile shape, wherein the profile height changes slowly from one furrow 14 to another furrow 14 as the radius R is typically a few millimeters.

The number of lines, at L=1250 lines/mm, is selected to be comparatively high and provides that, upon perpendicular incidence of the white light 10, that is to say $\phi=0$, only a single order of diffraction occurs within a range of viewing angles of $\theta=0°$ through 60°, at which the viewer 12 (FIG. 1) normally views the surface pattern 1, in the visible wavelength range, apart from specular reflection. The viewer 12 then sees the surface pattern 1 for example at a viewing angle of $\theta\approx35°$ as a blue surface, at a viewing angle of $\theta\approx45°$ as a green surface and at a viewing angle of $\theta\approx55°$ as a red surface. It will be appreciated that, with a steady change in the viewing angle from $\theta\approx35°$ through $\theta\approx55°$ there is continual transition in terms of color. As will be described hereinafter the surface pattern 1 does not appear uniformly light but, according to the rotational symmetry of the profile height $h(x,y)$, concentric rings are visible, with the color corresponding to the viewing angle $\theta$, of varying lightness and in varying numbers.

The following observation is also set out at this point for the sake of enhanced clarity. The optical effects which occur are on the one hand more easily describable and more easily understandable if the position of the surface pattern 1 is fixed with reference to the incident light 10 and the viewer 12 (FIG. 1) moves in order to adapt his viewing angle to the desired diffraction angle $\theta$. On the other hand, a person in the street will usually not move his head to and fro in order to verify the effects described herein, but will tilt and/or turn the surface pattern 1.

Figure 3A:
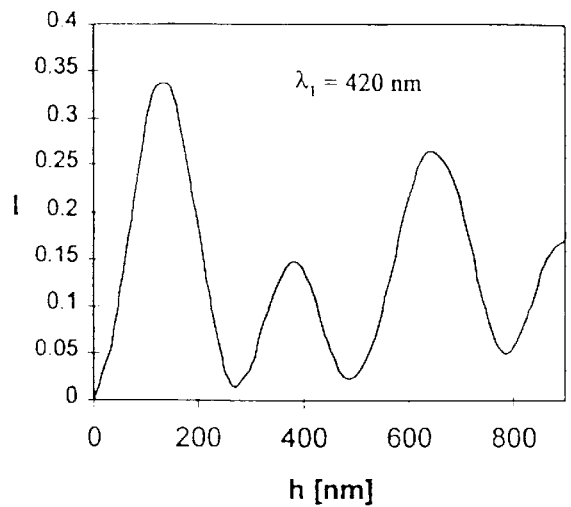
FIGS. 3a–3d show diffracted light intensities.
Figure 3B:
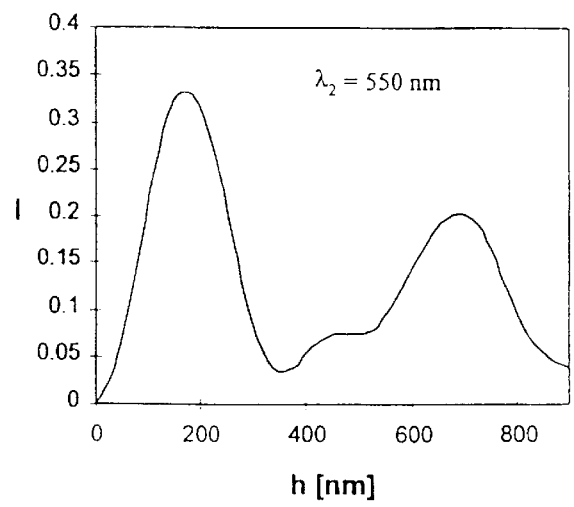
Figure 3C:
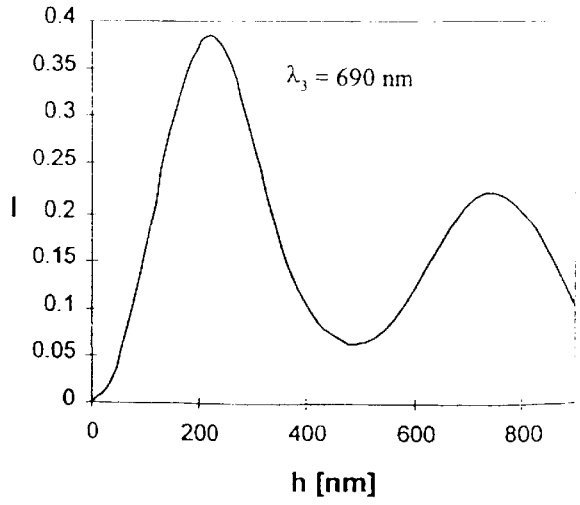

FIGS. 3a through 3c show the intensity of the light diffracted into the first diffraction order for the three selected wavelengths $\lambda_1=420$ nm (blue), $\lambda_2=550$ nm (green) and $\lambda_3=690$ nm (red) as a function of the optical profile height h. The intensity curves are calculated in accordance with the rigorous theory referred to in the opening part of this specification and apply in respect of unpolarised light which impinges perpendicularly onto the surface pattern 1, wherein the calculation was based on aluminum as the material for the reflection layer 6 and a value of n=1.5 as the refractive index of the lacquer layer 5. With $\lambda_1=420$ nm (blue) four light zones occur in the range of the optical profile height h of 150 nm through 900 nm. With $\lambda_2=550$ nm (green) and $\lambda_3=690$ nm (red) in contrast there are only two light zones, the width and position of which are however different.

With a continual increase in the magnitude of the viewing angle from $\theta=35°$ through 55° the viewer 12 thus sees how light circular rings move continuously towards the edge on the fixed surface pattern 1, wherein the color of the rings passes through the rainbow spectrum from blue to red, the number of light rings decreases and the width of the light rings slightly increases. For illustration purposes FIGS. 4a and b show the surface pattern 1 when viewing at the selected angles $\theta=35°$ and $\theta=55°$. In the former case four light blue circular rings 30 shine while in the second case there are only two light red circular rings 30.

When the surface pattern 1 is tilted about an axis parallel to the furrows 14 of the grating the angle $\phi$ of incidence (FIG. 1) of the impinging light 10 alters. The light 13 of another spectral color, which is diffracted into the first diffraction order, then successively impinges on the eye, which is at rest, of the viewer. The variation in the angle of incidence φ means however that the effective optical profile height h becomes smaller in accordance with the cosine of the angle of incidence φ' (FIG. 1) in the lacquer layer 5. The consequence of this is that, at various viewing angles θ(φ) at which the same color is recognised, the width and lightness of the light zones already changes slightly as a result of that tilting alone. The reduction in the effective optical profile height is limited to a fraction of the optical profile height h as, with a change in the angle of incidence θ, for example from 0° through 30°, the angle φ' in the lacquer layer 5 typically alters from 0° through 20° and the cosine of the angle of incidence φ' alters by typically 6 percent. In that way the described optical effects are qualitatively retained.

When the surface pattern 1 is illuminated under normal conditions of illumination, that is to say with a light source which is extensive in terms of angle, for example in daylight in the open air or under a neon tube, the angle of incidence φ (FIG. 1) of the light 10 is not sharply defined but includes a relatively large angular range. Accordingly the surface pattern 1 does not diffract the light of a single spectral color but light which is composed of adjacent spectral colors, in the direction associated with the viewing angle θ. Because of the high number of lines of 1250 lines/mm, the colors which are greatly different are far apart in terms of angle, that is to say the spectral colors which are in superposed relationship in a viewing direction have related color shades, that is to say predominantly red or predominantly blue shades. If in addition the surface of the substrate 11 is rough, which is always the case with paper, then the overlapping of different spectral colors is further increased, More specifically spreading of a spectral color as a result of the roughness of the surface of a typical paper is about ±5°, that is to say the light of a spectral color is diffracted not only at the diffraction angle θ but approximately at the angles θ−5° through θ+5°. The mixed colors have color shades which can still always be recognised, because of the high number of lines. The described effects are therefore qualitatively retained even with an extensive light source and a rough substrate surface.

In the zero diffraction order, that is to say in the case of specular reflection, different colors and color shading effects can be seen, which in the above example also form a concentric pattern. If the angle of incidence φ and thus the diffraction angle θ=φ of zero order changes the concentric color rings experience a radial motion as the effective optical profile depth changes again when tilting occurs.

Figure 3D:
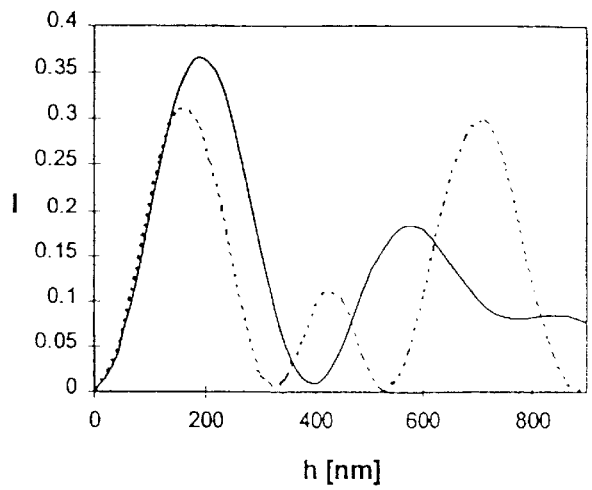

The surface pattern 1 also changes in a predetermined manner the polarisation of the diffracted and reflected light 13 (FIG. 1). FIG. 3d shows the levels of intensity of the light which is diffracted into the first diffraction order, for the wavelength 550 nm in the two polarisation planes perpendicularly (solid line 28) and parallel (broken line 29) to the grating furrows 14 (FIG. 1) which in total give the intensity curve shown in FIG. 3b. If the position of a polarisation filter, which is held over the surface pattern 1 is set for the light in accordance with the solid curve and then the position of the polarisation filter is altered through +90°, then from the point of view of the viewer the pattern of the light rings in accordance with the solid-line curve changes to the pattern corresponding to the broken-line curve. If therefore a viewer observes the surface pattern 1 (FIG. 1) with perpendicularly incident light at an angle of about 45° through the polarisation filter, he will observe how the surface pattern 1 is represented as a brightness pattern which is dependent on the position of the polarisation filter, that is to say the number and the position of the concentric rings vary when the polarisation filter is turned. Similarly, the will also perceive in the zero diffraction order, that is to say in specular reflection, an arrangement of concentric color rings which is dependent on the position of the polarisation filter.

EXAMPLE 2

In a further surface pattern 1 (FIG. 1) the relief structures 9 in the circle 15 (FIG. 2) have sawtooth-shaped furrows 14 (="blaze grating"), wherein the geometrical profile height $h_g$ of the furrows 14 is modulated with a sine function $$\sin\left(\frac{2\pi}{D}y\right).$$

The geometrical profile height $h_g$ is then given by:

$$h_g(x, y) = h_0 * \left(1 + \beta * \sin\left(\frac{2\pi}{D}y\right)\right) \quad (2)$$

wherein β is a number between 0 and 1 and $h_0$ is a constant. The minimum and maximum optical profile height h of the furrows 15 are 500 nm and 1500 nm respectively. The period D of the modulating sine function is typically in millimeter range. The number of lines L of this blaze grating is comparatively small at about 330 lines/nm. FIGS. 5a through 5c show the intensity of the light diffracted in various diffraction orders as a function of the optical profile height h with light 10 incident perpendicularly, that is to say φ=0, on the surface pattern 1. At the diffraction angle θ=25° the light in the visible wavelength range is diffracted into the two diffraction orders m=2 and m=3 with the highest level of intensity if the optical profile height h is approximately in the range of 500 through 800 nm. At the diffraction angle θ=55° however the three diffraction orders m=4, m=5 and m=6 have the highest level of intensity, in which case the optical profile height h must be approximately in the range of 1100 through 1300 nm. Finally, at the diffraction angle θ=75° the three diffraction orders m=5, m=6 and m=7 occur with the highest level of intensity if the optical profile height h is approximately in the range of 1300 through 1600 nm. Because of the sawtooth-shaped profile configuration the diffraction angle ranges of the various diffraction orders for the same profile heights h overlap to a relatively considerable degree, as is shown in the drawing by the configuration of the curve lines in FIG. 5. It is therefore possible to associate with each optical profile height h a given diffraction angle at which zones of the surface pattern 1 with the corresponding optical profile height h appear at the lightest. That association is approximately linear over a wide range of diffraction angles θ, as can be seen from FIG. 6.

Modulation of the profile height h with a function which is periodic, here sinusoidal, in the y-direction, now has the consequence that, under normal illumination conditions, the zones which are of different degrees of lightness on the surface pattern are light and dark stripes which extend perpendicularly to the y-axis. The optical behaviour and characteristics of the stripes will now be described with reference to FIG. 7. Along the y-axis the profile shape A varies in accordance with equation (2). Plotted on the ordinate in FIG. 7 are the optical profile height h and in accordance with curve shown in FIG. 6 the diffraction angle θ at which the stripes with the profile height h appear at their lightness. If the observer views the surface pattern 1 at a viewing angle of θ≈25°, then those stripes in which the optical profile height h is of a minimum value appear to him light. For each period D therefore there is a single light stripe visible, illustrated by a point ·. When the surface pattern 1 is tilted about the x-axis the stripes which correspond to zones with an increasing profile height h become visible with an increasing viewing angle. It will be seen from FIG. 7 that in that case per period D, two light stripes are visible. The stripes which appear light for example at θ≈45° are represented by a black square ■. At θ≈75° the stripes marked with an asterisk * appear light, those stripes corresponding to the zones with the maximum profile height h=1500 nm. In this case also there is again a single light stripe per period D. With a viewing angle of θ≈25° therefore light stripes at the spacing of the period D, which are separated by dark stripes, are visible on the surface pattern 1. With a continual change in the viewing angle from θ≈25° through θ≈75° the light stripes divide into two light stripes which move in the opposite y-direction until at θ≈75° they in turn combine with the adjacent stripes to form a single light stripe. The stripes which are visible at θ≈75° are displaced relative to the stripes visible at θ≈25°, by half a period length D/2. As the spectral colors of the various diffraction orders respectively occur at a different diffraction angle θ the color of the light stripes which are perceptible from a given direction θ is usually a mixed color which is also slightly dependent on the viewing angle θ.

The local differential coefficient of the function with which the optical profile height h is modulated is not constant. The extent of the modulation depth range which appears light at a predetermined viewing angle θ is in this example about 300 nm and is approximately independent of the profile height h. Accordingly the gradient of the differential coefficient acts directly on the width of the light zones which appear light at the viewing angle θ. Upon tilting about the x-axis therefore it is not only the position of the light and dark zones that changes, but also the extent thereof in the y-direction depending on the differential coefficient of the modulating function.

EXAMPLE 3

The third Example is based on a grating whose number of lines at L=500 lines/mm is selected in such a way that in the visible range, with perpendicular incidence of the light 10 (FIG. 1) and with a smooth surface for the substrate 11 (FIG. 1), three diffraction orders occur, which are separated in terms of angle: the first diffraction order includes the angle range of 13° through 19°, the second diffraction order includes the angle range of 27° through 41° and third diffraction order includes the angle range of 42° through 77°. In this case the furrows 14 (FIG. 1) extend parallel to the x-direction. Modulation of the optical profile height h of the surface pattern 1 (FIG. 9) occurs along the x-direction in accordance with the function F(x) shown in FIG. 8. FIG. 8 also shows the intensity of the light diffracted into the first, second and third diffraction orders, as simple scalar theory provides, in respect of the three wavelengths $\lambda_1$=450 nm (blue), $\lambda_2$=550 nm (green) and $\lambda_3$=650 nm (red).

When the surface pattern 1 is illuminated with a light source which is extensive in terms of angle the surface pattern 1 diffracts in the direction associated with the viewing angle θ not the light of a single spectral color but mixed light which is composed of a plurality of spectral colors. The roughness which is present in any case on the surface of the substrate 11 further increases the overlapping of different spectral colors. With a number of lines L=500 lines/nm the three diffraction orders nonetheless remain approximately separated in terms of angle.

When the surface pattern 1 is tilted about the x-axis light of the first, second and finally the third diffraction orders is therefore successively incident in the eye of the viewer. FIGS. 9a–c qualitatively show the brightness distribution of the surface pattern 1 for the viewing angles $\theta_1$=16°, $\theta_2$=34° and $\theta_3$=60°. At those selected viewing angles therefore the viewer sees light which is diffracted into the first or the second or the third diffraction orders as a mixed color which is dependent on the extent of the light source and the roughness of the substrate. That mixed color generally varies from diffraction order to diffraction order.

As can be deduced from the intensity curves shown in FIG. 8, at the angle $\theta_1$=16° zones 16 whose optical profile depth h is either in the region of the first or the second maximum of the intensity curves of the first diffraction order appear light. At the angles $\theta_2$=34° and $\theta_3$=60° those zones 17, and 18 are light, whose optical profile depth h is in the region of the single maximum of the intensity curves of the second and third diffraction orders respectively. When the surface pattern is tilted about the x-axis therefore light stripes move in accordance with the modulation function F(x) in or in opposite relationship to the x-direction, in which respect in particular upon a change from one diffraction order to the next there is in each case a marked change in the position and width of the light and dark stripes. In accordance with the foregoing information, those changes are clearly perceptible when the viewing angle changes from about 19° (first diffraction order) to about 27° (second diffraction order) or in the transition from the second to the third diffraction order exceeds the value of about 41°. The dark zones 19 which spread from the corners of the surface pattern 1 also markedly increase in width in the tilting movement in each case when changing from one diffraction order to the next as the first maximum of the intensity curves is displaced with increasing diffraction order towards greater profile heights h. Upon continuous tilting movement of the surface pattern 1 about an axis parallel to its furrows 14 the position of the light and dark zones therefore changes partially steadily (within a diffraction order) and partially abruptly (at the transition from one diffraction order to the next).

The geometrical shape or contour of the surface pattern 1 is also particularly suitable for referencing the movement of the light zones. In the case of a first example as shown in FIGS. 10a and 10b the geometrical boundary of the surface pattern 1 also varies with the period D: the width B(y) of the surface pattern 1 in the x-direction is modulated in the y-direction by the period D. Therefore the altered y-position of the light and dark zones is additionally expressed in accordance with the width B(y) in a differing length of the stripes perceived and can therefore be very easily recognised. FIG. 10a shows the stripes 20 which in the configuration in accordance with Example 2 are light at the viewing angle θ≈25° while FIG. 10b shows the stripes 21 which are light at the viewing angle θ≈75°. Because of the specific contour of the surface pattern 1 the stripes 20 are markedly shorter than the stripes 21. The contour of the surface pattern 1 represents an additional configurational element and the extent and, the position of the light stripes reflect the contour of the surface pattern 1 upon a change in the viewing angle θ.

The boundary can be achieved in many different ways: the area surrounding the surface pattern 1 can be for example a matt structure or a mirror. In addition it can be so altered by local removal of the reflection layer 6 (FIG. 1) or by being subsequently printed upon with an opaque ink that it no longer has an optical-diffraction effect. Local transfer of the surface pattern 1 onto the substrate is also possible by means of a punch, in which case only the surface pattern 1 but not the surface surrounding the surface pattern 1 is transferred.

In a second example shown in FIG. 11 the surface pattern 1 represents a line-like surface. When a point P moves along the line in the y-direction over a distance $y_1$. then the point P moves in the x-direction by a distance $x_1$ which is markedly greater, for example greater by a factor of 10, than the distance $y_1$. In the case of a tilting movement the position of the light zones of the surface pattern 1 in turn moves, in which case now however a small change in the y-position of the light zones is linked to a large change in the x-position of the light zones. The displacement of the light zones when the tilting movement occurs is therefore very readily recognisable as a movement of a light spot or point along the line.

The combination of a plurality of such surface portions on a surface serving as a background forms a surface pattern 1 which combines movements of light and dark zones in many different ways.

If modulation of the profile height h is implemented with the sine function $\sin(\overline{k}*\overline{x})$ so that the profile height h is proportional to $1+b*\sin(\overline{k}*\overline{x})$, wherein the length of the k-vector is $$\frac{2\pi}{D}$$

and the k-vector includes an angle $\alpha$ with the x-axis, then the stripes extend along a direction which includes the angle $\alpha-90°$ to the x-axis and when the surface pattern 1 is tilted about the x-axis they move along the direction which is defined by the angle $\alpha$. In this case also the geometrical contour (shape) of the surface pattern 1 can be adapted to the movement of the light stripes in such a way that the length thereof changes markedly in such movement.

The surface patterns 1 as described hereinbefore have a single optically-effective surface in which the furrows 14 (FIG. 1) of the basic grating are parallel. It is now possible to form further surface patterns with a plurality of diffraction-effective surface portions arranged in side-by-side relationship and/or superposed graphic motifs which for example are applied by a printing procedure, in regard to which the orientation of the furrows of the gratings, the profile shape of the gratings and/or the nature of modulation of the optical profile height h are different so that the predetermined variations in brightness can be so characteristically and easily impressed in the human memory that the person in the street can easily distinguish the original surface pattern 1 from imitations.

FIG. 12 shows such a surface pattern 1 with two surface portions 22 and 23 which represent a cross and a background. The two surface portions 22 and 23 have a grating structure involving the same orientation of the furrows 14 (FIG. 1) and the same number of lines. The profile height h of the grating structure of each surface portion 22 and 23 respectively is modulated with a periodic function $f_1(y)$ and $f_2(y)$ respectively along the y-axis. In a first example $f_1(y)=f_2(Y+D/2)$, that is to say the two functions have the same period D but are displaced relative to each other by half a period. The greatest dimension of the surface portion 22 in the y-direction is preferably an integral multiple of the period D. In a second example both functions $f_1(y)$ and $f_2(y)$ are of the same period D and have the same range of values in respect of the profile heights but they are different in terms of their shape, for example $$f_1(y) = B\left|\sin\left(\frac{2\pi}{D}y\right)\right| \text{ and } f_2(y) = B\sin^2\left(\frac{2\pi}{D}y\right).$$

The consequence of this is that the zones of different brightness in the two surface portions 22, 23, at given tilt angles, are in the same position, but they move at different rates when tilting occurs. In a third example the line which is visible in FIG. 12 as mutual boundaries of the surface portions 22 and 23 is a third surface portion 24 which contains a diffraction grating with for example 1200 lines/nm. The line appears in a changing color in a predetermined range of tilt angles and it appears in the form of a dark line outside that range of tilt angles. The viewer can orient himself in relation to that line when he verifies the change in the light and dark zones when the surface pattern is tilted. The line represents a stationary element whose length does not change when the tilting movement occurs so that it can serve for referencing of the movement of the light and/or dark zones.

FIG. 13 shows a further surface pattern with surface portions in the form of lines 25. Each line 25 has a grating structure with a different orientation of the furrows 14 (FIG. 1). The profile height of the grating structures is modulated with a periodic function f(x,y). When the surface pattern is turned about an axis perpendicular to its plane at least one line 25 or the other lights up, in which case the line 25 has light and dark zones of the same color, according to the modulation involved, that is to say for example it lights up as a green line of zones involving different brightness, that is to say, in the form of a broken line. The color in which the viewer 12 perceives the line depends on the viewing angle $\theta$. Upon a variation in the viewing angle $\theta$, besides the color it is also the position and possibly the number of zones of the line which appear light or dark that change. The function f(x,y) can be the same or however also different, for each of the surface portions in the form of lines 25. In addition the function f(x,y) can be adapted to the element in line form, for example in such a way that the function f(x,y) is periodic with the distance along the line. It will be self-apparent that the function f(x,y) does not need to be periodic.

FIG. 14 shows a further surface pattern with the two rectangular surface portions 22 and 23. Within the surface portion 22 the profile height h is established symmetrically from the center of the rectangle towards the edge in such a way that the profile height h is constant along concentric lines 26 shown in broken line in the drawing. Within the surface pattern 23 the profile height h is selected to be symmetrical with respect to the center in such a way that the profile height h is dependent only on the angle in relation to the x-axis but not on the spacing from the center. Therefore when the surface pattern is turned and/or tilted the two surface portions 22 and 23 create patterns with light and dark zones which involve a different motional configuration.

In a development of this surface pattern the area covered by the surface portion 22 is rastered into points, the dimensions of which are at most 0.15 mm. In this case the points are associated alternately with the representations of the surface portions 22 and 23 in accordance with the teaching of European patent EP 330 738 so that the variation in brightness of the two patterns can be seen in the small rectangle 22.

In the described examples the optical profile height h was varied insofar as the geometrical profile height $h_g$ of the relief structures 9 (FIG. 1) was modulated but the refractive index of the lacquer layer 5 covering the relief structures 9 was left constant. Another option, even if technologically more complicated and expensive, is modulation of the refractive index of the lacquer layer 5 or modulation of the refractive index of the lacquer layer 5 and the geometrical profile height $h_g$ of relief structures 9 in order to achieve the desired modulation of the optical profile height h. Refractive index modulation can be achieved for example by local doping of the lacquer layer 5 with a dye. For the sake of greater ease of understanding, grating structures with straight furrows have preferably been described herein, although it is also possible to use curved furrows.

Modulation of the profile height h of the grating with either a monotonically rising function or with a periodic function, in which respect the function is not rectangular, produces the described continual movement of light and dark zones upon a change in the viewing angle. In this respect, under normal illumination conditions, depending on the number of lines of the grating, the surface pattern appears either pronouncedly colored with strong colors or, for example in daylight or in the light of a lamp or a neon tube, it appears achromatically in a mixed color.

Copying a surface pattern 1 according to the invention is found to be a difficult procedure. Holographic copying processes are not capable of copying the profile shape and the profile height of the relief structures 9 (FIG. 1) so that a copy of that kind generates altered optical effects in comparison with the original. As the relief structures 9 are covered with the lacquer layer 5 the geometrical profile height $h_g$ and the profile shape thereof are also not directly measurable. Removal of the lacquer layer 5 without damaging or destroying the relief structures 9 is very difficult. Accordingly exact copying is also practically out of the question.

What is claimed is:

1. A surface pattern with a reflection layer embedded between two lacquer layers of a laminate with diffractive structures for creating optically variable effects, and at least one surface portion extending in a plane of the laminate defined by the co-ordinates x and y, the surface portion having a microscopically fine relief structure with a constant number of lines per millimeter, which diffracts visible light at least into first diffracting orders, wherein an optical profile height h of the relief structure is location-dependent modulated by an at least portion-wise continuous, non-rectangular modulation function F(x,y) within at least one of the surface portions so that the relief structure has the geometrical profile shape A(x,y)=g(x,y)*F(x,y), wherein the profile shape g(x,y) describes a diffractive grating having the constant number of lines per millimeter, a constant profile height h and straight or curved parallel furrows, wherein the modulation function F(x,y) changes in its continuous region slowly compared to the profile shape g(x,y), and wherein for visible wavelengths at least a local maximum of an intensity curve of one of the non-zero diffracting orders falls within the range of the optical profile height h values of the relief structure.

2. The surface pattern as set forth in claim 1 wherein the relief structure forms a grating in which the number of lines is less than 400 lines/mm and the relief structure diffracts white light in such a way that light zones appear substantially achromatic in a predetermined viewing range.

3. The surface pattern as set forth in claim 1 wherein the relief structure forms a grating in which the number of lines is between 400 and 800 lines/mm, and wherein positions of light zones substantially abruptly change upon continuous tilting of the plane of the laminate about an axis parallel to the furrows.

4. The surface pattern as set forth in claim 1 wherein the relief structure forms a grating with a number of lines of greater than 800 lines/mm and diffracts white light only into the zero$^{th}$ and the first diffracting orders so that the light zones appear pronouncedly colored.

5. The surface pattern as set forth in claim 2 wherein the modulation function F(x,y) is of such a value range that the optical profile height h is in the range of between 500 mm and 1600 mn.

6. The surface pattern as set forth in claim 1 wherein a contour of the surface pattern or the surface portion represents a configurational element, and wherein the reflection layer is formed in the surface pattern or the surface portion of the configurational element as a matt structure, as a mirror or as a diffraction grating which differs from the relief structure by at least one grating parameter.

7. The surface pattern as set forth in claim 1 wherein a contour of the surface pattern or the surface portion represents a configurational element, and wherein the reflection layer is locally removed in the surface pattern or the surface portion of the configurational element and/or is altered by being subsequently printed upon with an ink so that the reflection layer no longer has an optical-diffraction effect.

8. The surface pattern as set forth in claim 1 wherein a contour of the surface pattern or surface portion represents a configurational element, and wherein the extent of a width B of the surface pattern or the surface portion measured perpendicularly to a direction R is modulated proportionally to the modulation function F(x,y) of the surface-portion.

9. The surface pattern as set forth in claim 1 wherein the modulation function F(x,y) of at least one surface portion is periodic in a predetermined direction R and has a predetermined period D in the millimeter range.

10. The surface pattern as set forth in claim 1 wherein the modulation function F(x,y) of at least one surface portion is periodic in a predetermined direction R and has a predetermined period D in the millimeter range, and wherein at least one surface portion with the modulation function F(x,y) has a dimension in the predetermined direction R of an integral multiple of the period D.

11. The surface pattern as set forth in claim 4 wherein the modulation function F(x,y) is of such a value range that the optical profile height h is in the range of between 150 nm and 900 nm.

12. The surface pattern as set forth in claim 1 wherein there are a first surface portion with a first modulation function $F_1(x,y)$ and at least one further surface portion with a further modulation function $F_2(x,y)$, the relief structures of which are the same except for the modulation functions $F_1(x,y)$, $F_2(x,y)$.

13. The surface pattern as set forth in claim 12 wherein a first modulation function $F_1(x,y)$ of the first surface portion and a further modulation function $F_2(x,y)$ of the further surface pattern are periodic in a common predetermined direction R and are of the same predetermined period D in the millimeter range, and wherein the first modulation function $F_1(x,y)$ and the further modulation function $F_2(x,y)$ are displaced by a fraction of the period D.

14. The surface pattern as set forth in claim 13 wherein the first modulation function $F_1(x,y)$ and the further modulation function $F_2(x,y)$ are displaced by half a period D.

15. The surface pattern as set forth in claim 12 wherein the first modulation function $F_1(x,y)$ of the first surface portion and the further modulation function $F_2(x,y)$ of the further surface portion are linear within their surface portions and pass through the same value range from a minimum value to the maximum value in opposite directions $R_1$ and $R_2$.

16. The surface pattern as set fort in claim 12 wherein the further surface portion and the fist surface portion at least partially overlap, wherein in the common region of the sure portions raster elements of the first surface portion and raster elements of the further surface portion are arranged alternately and in accordance with their degree of modulation by the modulation function $F_1(x,y)$ and $F_2(x,y)$ respectively, and wherein the raster elements at least of the further surface portion are of dimensions of at most 0.15 mm.

17. The surface pattern as set forth in claim 1 wherein the modulation function $F(x,y)$ within at least one surface portion varies monotonically from an extreme value to the adjacent extreme value in a predetermined direction R.

18. The surface pattern as set forth in claim 1 wherein the modulation function $F(x,y)$ varies from a point within the surface portion in a radial direction from an extreme value to the adjacent extreme value on the boundary of the surface portion.

19. The surface pattern as set forth in claim 1 wherein the modulation function $F(x,y)$ is at least a portion of a rotationally symmetrical function.

20. The surface pattern as set forth in claim 1 wherein the modulation function $F(x,y)$ within said surface portion varies monotonically from an extreme value to the adjacent extreme value over a range of several millimeters in a predetermined direction R, and wherein the width of the surface portion measured perpendicular to the direction R is modulated by the modulation function $F(x,y)$.

21. The surface pattern as set forth in claim 1 wherein the profile shape $g(x,y)$ of the relief structure is a sine function.

22. The surface pattern as set forth in claim 1 wherein the profile shape $g(x,y)$ of the relief structure is a sawtooth function.

23. The surface pattern as set forth in claim 1 wherein the modulation function $F(x,y)$ is of such a value range that within the surface portion the maximum value of the optical profile height h is a value between 500 nm and 1600 nm.

24. The surface pattern as set forth in claim 1 wherein the modulation function $F(x,y)$ within at least one surface portion varies monotonically from an extreme value to the adjacent extreme value in a predetermined direction R.

* * * * *